(12) United States Patent
Bschaden et al.

(10) Patent No.: US 12,130,213 B2
(45) Date of Patent: Oct. 29, 2024

(54) SYSTEM FOR MEASURING REAL-TIME AERODYNAMIC DRAG

(71) Applicant: GIBLI TECH INCORPORATED, Halifax (CA)

(72) Inventors: Benjamin Simon Bschaden, Charleston (CA); Mark Ernsting, North Vancouver (CA); Jacob William Gaucher, Halifax (CA)

(73) Assignee: GIBLI TECH INCORPORATED, Halifax (CA)

( * ) Notice: Subject to any disclaimer, the term of this patent is extended or adjusted under 35 U.S.C. 154(b) by 45 days.

(21) Appl. No.: 17/756,905

(22) PCT Filed: Dec. 4, 2020

(86) PCT No.: PCT/CA2020/051670
§ 371 (c)(1),
(2) Date: Jun. 3, 2022

(87) PCT Pub. No.: WO2021/108920
PCT Pub. Date: Jun. 10, 2021

(65) Prior Publication Data
US 2023/0019764 A1    Jan. 19, 2023

(51) Int. Cl.
*G01M 9/06*   (2006.01)
*G01N 19/02*   (2006.01)

(52) U.S. Cl.
CPC .............. *G01M 9/06* (2013.01); *G01N 19/02* (2013.01)

(58) Field of Classification Search
CPC ......... G01M 17/06; G01M 9/06; G01N 19/02
See application file for complete search history.

(56) References Cited

U.S. PATENT DOCUMENTS

| 7,377,180 B2 | 5/2008 | Cunningham |
| 7,387,029 B2 | 6/2008 | Cunningham |

(Continued)

FOREIGN PATENT DOCUMENTS

GB         2568885 A  *  6/2019  .............. B62J 45/41

OTHER PUBLICATIONS

Supplemental European Search Report, issued in PCT/CA20200051670 on Feb. 22, 2024.

*Primary Examiner* — Andre J Allen
(74) *Attorney, Agent, or Firm* — Jonathan Kidney; Intelink Law Group, P.C.

(57) ABSTRACT

The invention relates to a system for measuring real-time aerodynamic drag of a moving vehicle, for example, a bicycle and rider. The system comprises a processor and a non-transitory computer medium for storing data. Further, it comprises a single, compact, multi-port measurement system (MPMS) comprised of at least two differential pressure sensors electrically connected to the processor and the non-transitory computer-readable medium, wherein the processor is configured to convert a first differential air pressure from a first sensor to a wind speed, and to convert a second differential air pressure from a second sensor to a wind direction. The system further comprises a plurality of sensors for detecting forces, including barometric pressure, air temperature and relative humidity, distance, and speed, surrounding the moving vehicle. The plurality of sensors are electrically connected to the processor and the non-transitory computer-readable medium, and also store data.

10 Claims, 5 Drawing Sheets

(56) References Cited

U.S. PATENT DOCUMENTS

| | | |
|---|---|---|
| 8,612,165 B2 | 12/2013 | Froncioni et al. |
| 10,739,370 B2 * | 8/2020 | Morton .................. G01P 5/165 |
| 2019/0301969 A1 | 10/2019 | Morton et al. |
| 2021/0123831 A1 * | 4/2021 | Andrews .................. B62J 45/41 |
| 2024/0010198 A1 * | 1/2024 | Barton-Sweeney ......................... B60W 40/105 |

* cited by examiner

SYSTEM FOR MEASURING REAL-TIME AERODYNAMIC DRAG

FIELD

The present invention pertains to the field of aerodynamic measurement and in particular to a system and method for calculating in real-time aerodynamic drag acting on a vehicle and a system using artificial intelligence to analyze the vehicle and provide information on how to reduce drag coefficient.

BACKGROUND

Systems and apparatus in the field of aerodynamics apply Newton's third law of motion: for every action there is an equal and opposite reaction, i.e. the sum of all forces acting on a body must equal zero. Forces acting on a body include: potential, kinetic, acceleration, rolling resistance, drag, among others. Prior art in this field use the equation—the sum of all forces equals 0—to determine the aerodynamic drag coefficient ("CdA") of a moving vehicle in real-time, e.g. while a rider is riding a bike. The drawback with simply using the sum of all forces to find CdA is that the slope of the road needs to be a precise measurement. Obtaining precise slope measurement is often difficult particularly given the high level of signal noise and the amplitude of vibration from a road surface, and the need for the sensor to be perfectly level and/or a requirement for a calibration procedure.

Measuring wind speed and direction aid in acquiring a more accurate CdA. Such measurements are typically done so using pitot tubes. Traditionally manufactured or machined multi-probe pitot tubes are very expensive. To keep expenses low, alternatives include manufacturing a pitot tube that only measures wind speed or only measures wind direction, or to combine two pitot tubes—one to measure wind direction and the other to measure wind speed.

Some pitot tubes used are "shielded tubes", which are currently total pressure tubes, meaning there is no presence of a static port on a plane parallel to the direction of flow. Typically, these shields are generally of a cylindrical design, this is due to conventional machining practices and the total-pressure nature of these tubes (which are generally used for aircraft at high angles of attack).

Therefore, there is a need for a system measuring real-time aerodynamic drag to use an approach that does not require a precise slope measurement. Further, there is a need for a less expensive, more effective method capable of measuring air flow to efficiently measure wind speed and wind direction.

Further, the sensors used on already marketed aerodynamic tools require external access for various sensors to read environmental conditions, with complete ingress protection being practically impossible. Previously disclosed work all require the aerodynamic devices to not be used in poor conditions such as rain. Therefore, there is a need for a clearing/cleaning method to allow the aerodynamic device to be used permanently on a vehicle, regardless of weather conditions.

SUMMARY

In an embodiment of the invention, there is provided a system for measuring real-time aerodynamic drag of a moving vehicle, for example, a bicycle and rider. The system comprises a processor and a non-transitory computer medium for storing data. Further, it comprises a single, compact, multi-port measurement system (MPMS) comprised of at least two differential pressure sensors electrically connected to the processor and the non-transitory computer-readable medium, wherein the processor is configured to convert a first differential air pressure from a first sensor to a wind speed, and to convert a second differential air pressure from a second sensor to a wind direction. The system further comprises a plurality of sensors for detecting forces, including barometric pressure, air temperature and relative humidity, distance, and speed, surrounding the moving vehicle. The plurality of sensors are electrically connected to the processor and the non-transitory computer-readable medium, and also store data.

In an aspect of the invention, the non-transitory computer-readable medium stores data from the first sensor, second sensor, and plurality of sensors to be sent to the processor wherein the processor is configured to measure an aerodynamic drag coefficient (CdA) of the moving vehicle by integrating an equation solving the sum of the forces to sum of energy balance.

In an aspect of the invention, data from the system—measured by the first sensor, second sensor, and plurality of sensors—are uploaded via the processor to be stored in a computer-implemented application. The application uses artificial intelligence or machine learning to predict what the CdA will be in real-time based on scanning an image of a vehicle.

In an alternative embodiment of the invention, the system comprises a MPMS for subsonic flow with angle insensitivity in high yaw conditions. This embodiment comprises a shielded MPMS for high yaw situations that require true wind speed readings independent of yaw angle up to 50 deg. The shield is optimized to create axial flow along the MPMS regardless of yaw angle. By doing this, the maximum wind velocity component is always measured and the need for calibration of the MPMS at high yaw angles is mitigated or even eliminated. The shield comprises an internal cavity that contains a total pressure stagnation point some distance from the inlet of the shield. Air flows past this stagnation point and travels into the vent area that is larger than the area of the inlet, this eliminates any constriction effects that may cause a nozzle effect within the shield. The internal flow area of the shield remains the same throughout the length of the shield.

In another aspect of the invention there is provided a system for measuring real-time aerodynamic drag of a moving vehicle, comprising a processor, a non-transitory computer-readable medium for storing data and at least two Inertial Measurement Units (IMUs) mounted slightly off axis to each other to reduce sensor noise by fusing data together to simultaneously measure wind speed and wind direction detected by a plurality of ports on a multi-port measurement system. The IMUs are electrically connected to the processor and the non-transitory computer-readable medium. The system further comprises a plurality of sensors for detecting forces surrounding the vehicle in motion, the plurality of sensors electrically connected to the processor and the non-transitory computer-readable medium. The non-transitory computer-readable medium stores data from the IMUs and the plurality of sensors to be sent to the processor wherein the processor is configured to measure an aerodynamic drag coefficient of the vehicle by integrating an equation solving sum of forces to sum of energy balance.

BRIEF DESCRIPTION OF THE DRAWINGS

Reference will now be made, by way of example, to the accompanying drawings which show example embodiments of the present application.

Similar reference numerals may have been used in different figures to denote similar components.

While the invention will be described in conjunction with the illustrated embodiments, it will be understood that it is not intended to limit the invention to such embodiments. On the contrary, it is intended to cover all alternatives, modifications, and equivalents as may be included within the spirit and scope of the invention.

DESCRIPTION OF EXAMPLE EMBODIMENTS

Example embodiments of the system for calculating real-time aerodynamic drag of a moving vehicle, in this present invention, will now be described with reference to the attached figures.

Figure 1:
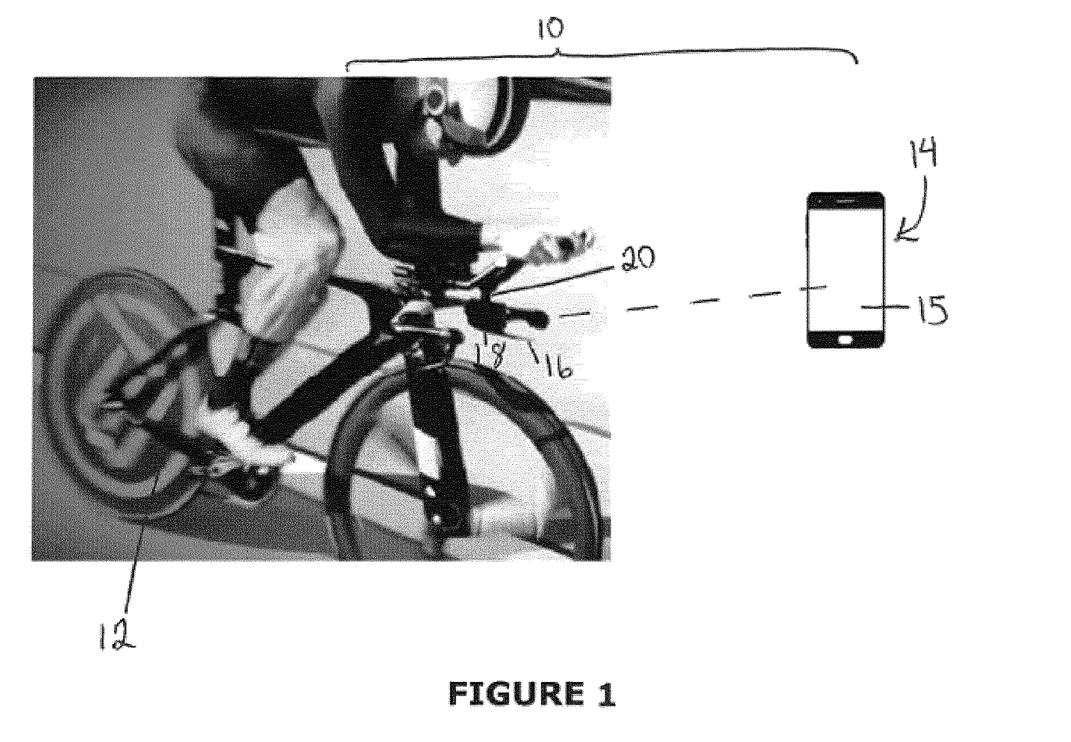
FIG. 1 illustrates a system for measuring aerodynamic drag of a moving vehicle, in accordance with an embodiment of the present invention.

FIG. 1 illustrates a system 10 used to calculate aerodynamic drag coefficient ("CdA"). The system is presented in the context of a vehicle 12 being a human powered bicycle; however, it can be adapted for other applications. The system is made up of a one-piece lightweight sensor body that is mounted on the vehicle 12 using an off the shelf computer mount 20. The sensor body 18 is electrically connected to a non-transitory computer medium (memory) 14 that is embedded in an interface device 15, shown as a smartphone but not limited to such, for presenting data/information in a readable format to a user.

Figure 2:
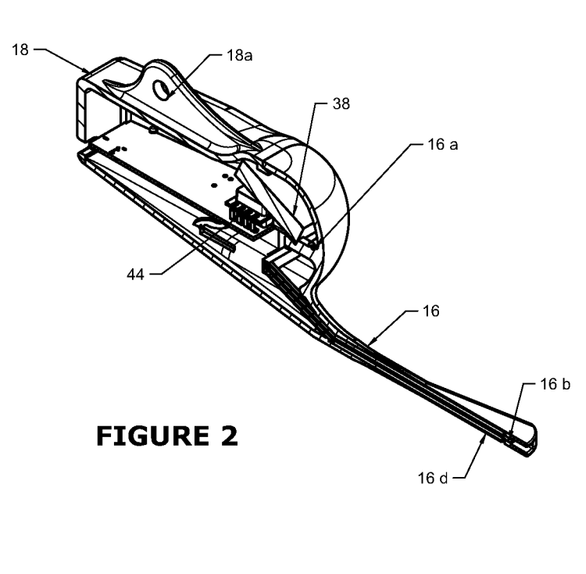
FIG. 2 illustrates a one piece sensor body with integrated pressure ports for air flow measure partially broken away, in accordance with an embodiment of the present invention.
Figure 3:
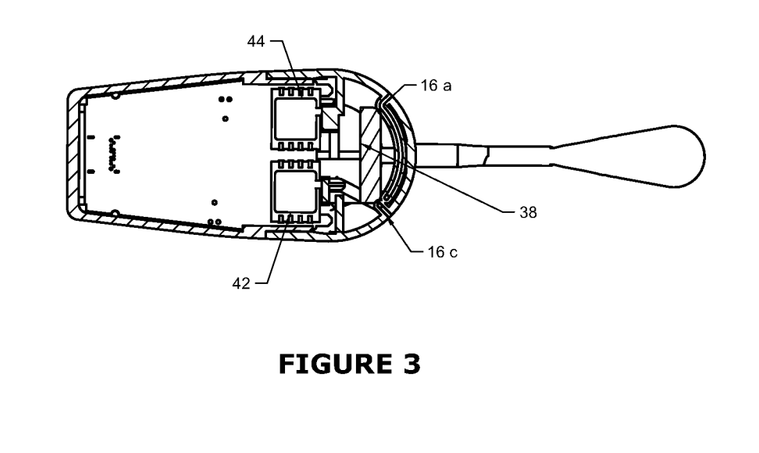
FIG. 3 illustrates a top, sectional view in accordance with an embodiment of the present invention.
Figure 4:
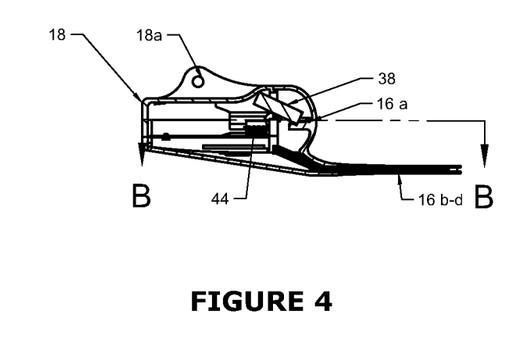
FIG. 4 illustrates a side, cross-sectional view in accordance with an embodiment of the present invention.
Figure 5:
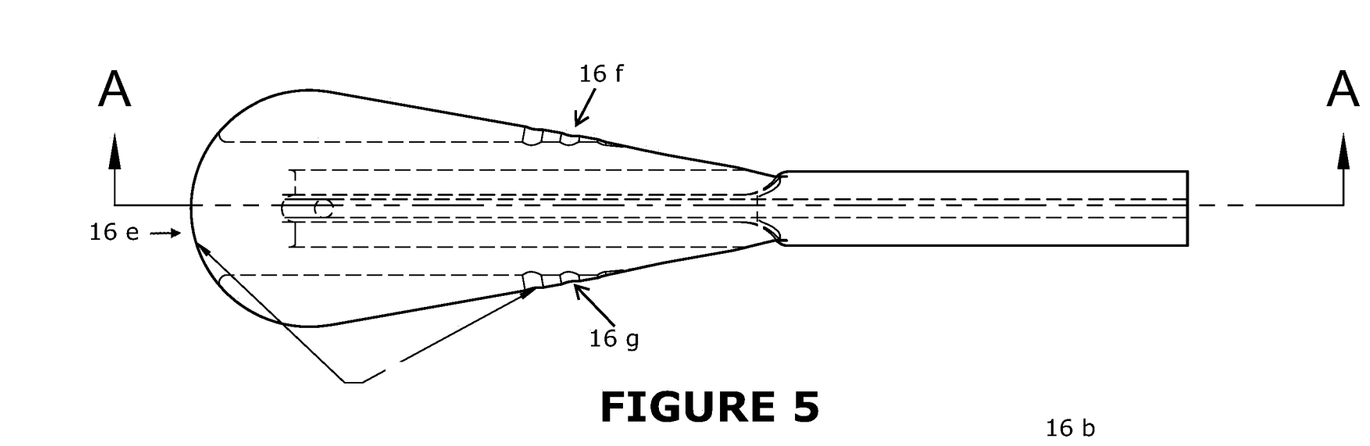
FIG. 5 is a top-section view the multi-port measurement system of FIGS. 2-4.
Figure 6:
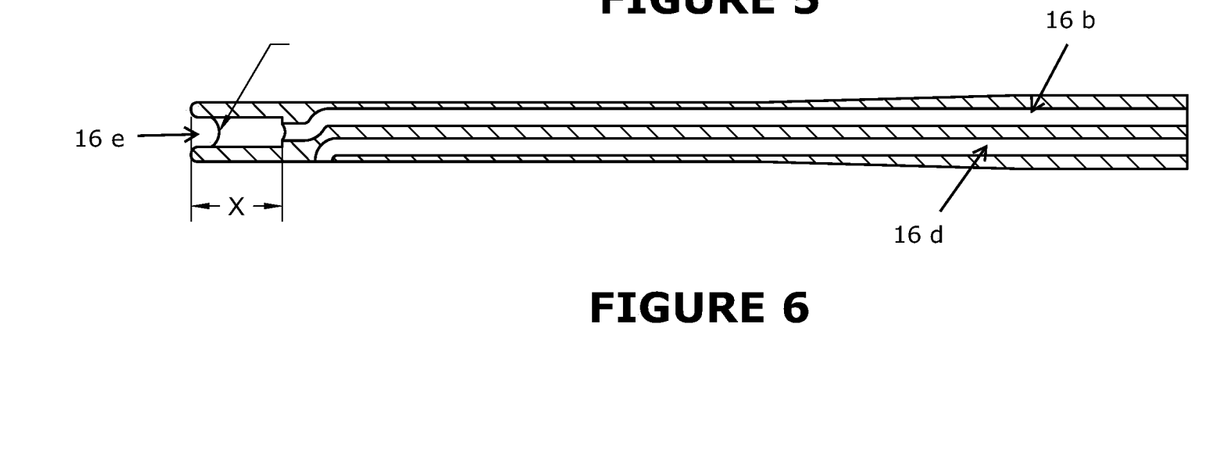
FIG. 6 illustrates a sectional view taken along line A-A of FIG. 5.
Figure 7:
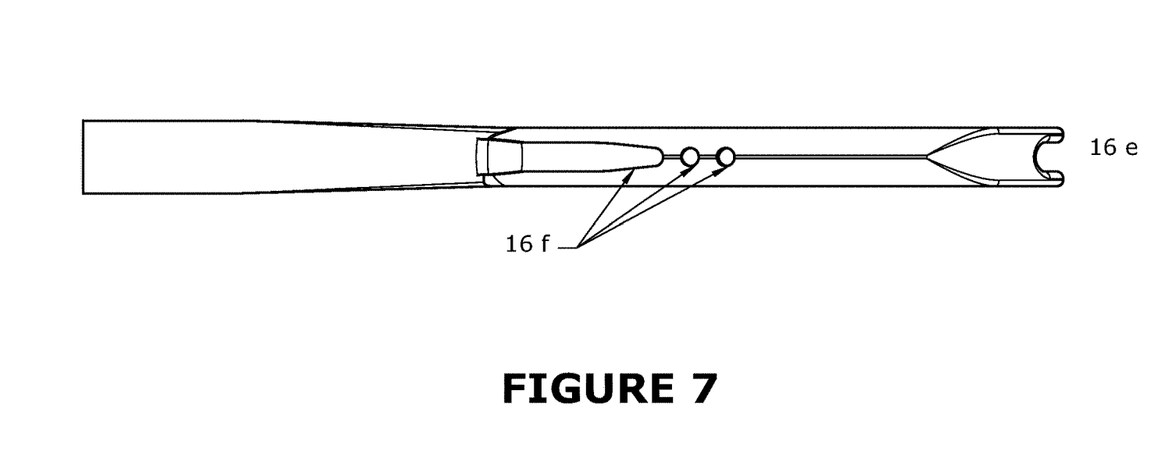
FIG. 7 is a side view of the multi-port measurement system of FIGS. 2-4.
Figure 8:
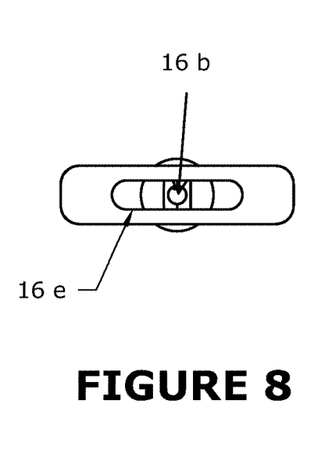
FIG. 8 illustrates the front-view of FIGS. 2-4.

Attached to the lightweight sensor body 18 is a multi-port measurement system (MPMS)16, as seen in FIG. 2, 6 mm in diameter or smaller that includes integrated air sensing channels 16a-16d, shown in FIGS. 2, and 4-6. The integrated air sensing channels 16a and 16c have ports that measure differential air pressures, the channels carry the differential pressures to a first differential pressure sensor 42 to measure wind direction. The integrated air sensing channels 16b and 16d have ports that measure differential air pressures, the channels carry the differential pressures to a second differential pressure sensor 44 to measure wind speed.

The multi-port nature of the design allows for various pressures to be measured. The differential pressure between ports B 16b and D 16d measures static and stagnation pressures to account for wind speed. The differential pressure between ports A 16a and C 16c measures wind yaw angle (direction). In one embodiment, ports A 16a and C 16c are at 45 degree angles to a forward facing direction.

The MPMS design enables for absolute measured relative wind speed to be independent from wind direction (within +/−40 degrees). Force acting on the vehicle 12 is reduced by cos (wind direction) to account for a component of wind acting orthogonally to the vehicle 12, in one embodiment shown as a bicycle and a rider.

In one embodiment, the calibration of the recorded pressure to actual wind direction is completed in a wind tunnel. In another embodiment, the MPMS 16 has extra pressure ports to measure the pressure field around the system 10 and subsequently calibrate the wind speed.

The MPMS 16 may be manufactured using 3D printing technique, using a multi-jet printing (MJP) process. In another embodiment, parts of the apparatus in the system are created using a stereolithographic (SLA) process. The process of 3D printing the MPMS 16 allows for a one-piece design of the MPMS and electronics case with the first and second differential pressure sensors 42, 44 fitted directly into an internal tube cavity. This process allows for a single small diameter tube and integrated case design to measure relative wind speed, wind direction, and in some embodiments to be used as a temperature and/or barometric pressure port. This process also allows for a less expensive and more effective means of producing a device that measure wind and air properties.

The sensor body includes a sensor section, processor section, battery section, wake up section, and power section. The sensors within the sensor section provide input to a processor, which is coupled to the non-transitory computer medium 14 and the interface device 15. In some embodiments, if desired or when required, the processor can be replaced with other processing circuitry.

The processor, operatively coupled to a Bluetooth/Ant+ module and to the non-transitory computer medium, is configured to receive signals from the various sensors. By executing programmed instructions stored in the memory 14, the processor performs calculations related to drag estimation, in one embodiment, and sends the calculated data to the interface device 15 to present the data to the user.

The sensor section includes: a barometric pressure sensor, a temperature and humidity sensor, a GPS sensor, an IMU sensor, the first differential pressure sensor 42, and the second differential pressure sensor 44.

The barometric pressure sensor measures air pressure or changes in altitude. The barometric pressure sensor can also be used to compute elevation. In some embodiments, the changes in altitude over time may be used to calculate slope. In one embodiment, the barometric pressure sensor system is set to the highest resolution rate to ensure accuracy of the measurement of the elevation change.

The temperature and humidity sensor measures air temperature and the concentration of vapors in the air. Both variables can be used to facilitate the calculation of air density.

The Global Positioning System (GPS) sensor measures ground speed. In one embodiment the GPS sensor system is set to minimum 10 Hz, fast enough to be able to calculate acceleration by differentiating the vehicle velocity.

The inertial measurement unit (IMU) sensor, collects data on the vehicle specific force, angular rate, and, in some embodiments, the orientation of the vehicle. In the preferred embodiment, the vehicle includes a bicycle and rider. In one embodiment, the IMU sensor accounts for change in rolling resistance. In one embodiment, the IMU sensor system is set to a minimum frequency to be fast enough to calculate an accurate FFT (Fast Fourier Transform) to determine vibration frequency peaks.

The first differential pressure sensor 42 and second differential pressure sensor 44, both of which are embedded in a multi-port measurement design to simultaneously, measure relative wind speed and wind direction. The differential pressure sensor system needs to be high enough to capture turbulence date. In one embodiment, the differential pressure sensor system is set to the highest rate In one embodiment, the sensors include a cadence sensor for determining pedaling rotational speed. In some embodiments, the cadence sensor is external to the common housing of the sensor body 18 used in the system 10.

In one embodiment, the sensors include a power meter sensor for determining the amount of power exerted by a vehicle, for example by a rider on a bicycle. In some embodiments, the power meter sensor is external to the common housing of the sensor body 18 used in the system 10.

In one embodiment, all of the sensors are included. In other embodiments, one or more sensors may be omitted, decreasing the functionality of the system. Data that is produced from an omitted sensor may, in some instances, be estimated, a fixed value, or as a function of another still present sensor input according to a predetermined relationship.

Figure 9:
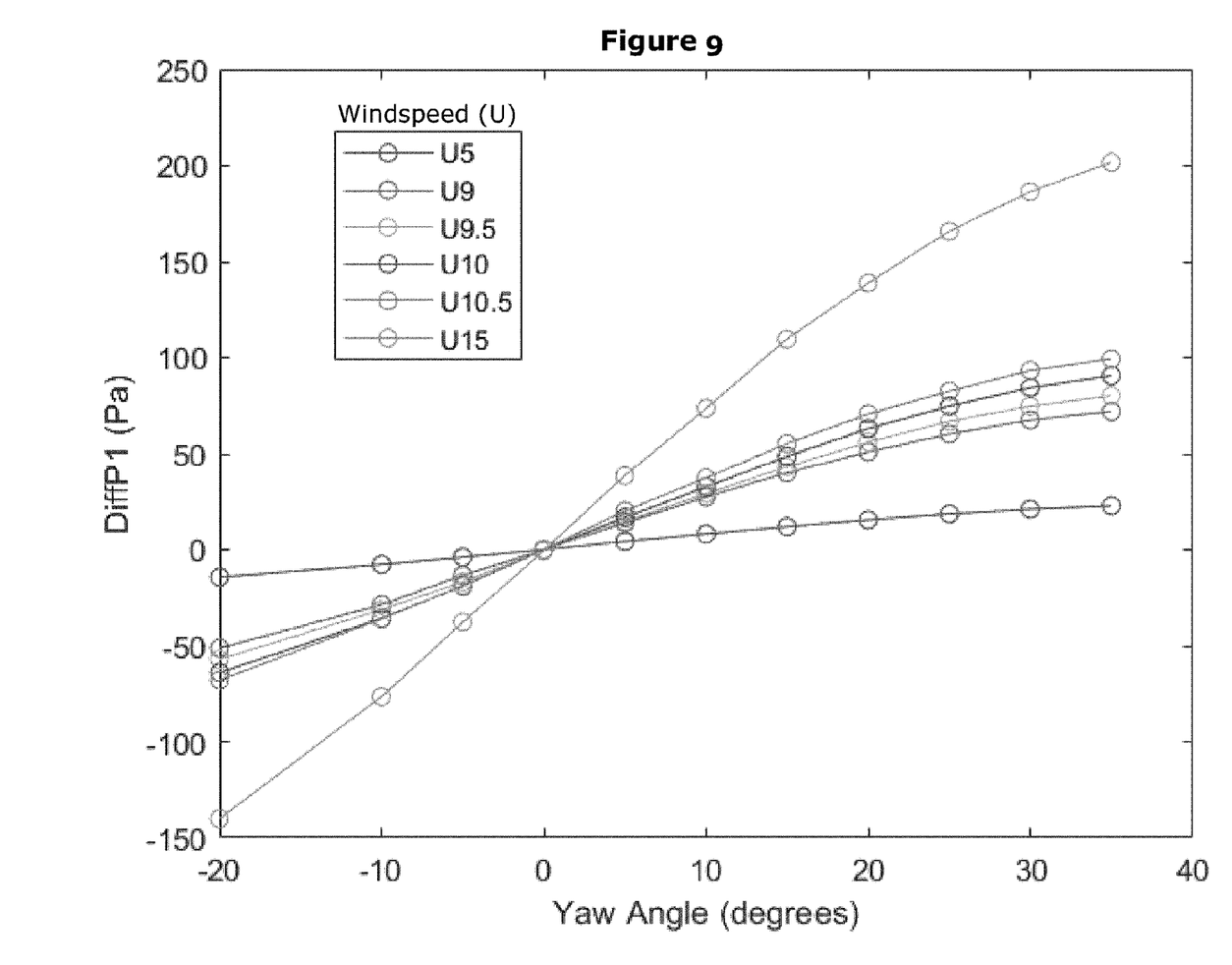
FIG. 9 displays differential pressure readings at various set yaw angles and wind speeds in a wind tunnel.

All embodiments decouple wind speed from wind direction. This invention decouples these measurements using the MPMS to always measure the maximum wind velocity regardless of yaw angle and independent set of yaw ports designed into the sensor case to eliminate calibration challenges if the tube is not perfectly straight. FIG. 9 shows that through wind tunnel testing, yaw and wind speed can be accurately decoupled by dividing the yaw pressure readings by the square of the wind velocity from the MPMS. The relative wind speed normalized yaw port pressure reading is then fit to a $3^{rd}$ order polynomial to the corresponding yaw angle.

Calculations for Determining CdA

In the preferred embodiment, data is captured from the barometric sensor, temperature and humidity sensor, GPS sensor, IMU sensor, the first differential pressure sensor 42, and the second differential pressure sensor 44 at a minimum of 10 samples per second. The data is filtered and averaged from the higher data rates to the data rate collected by the power meter by integrating the sum of the data.

Calculations are performed by sending the data captured from sensors via the Bluetooth/Ant+ module to the non-transitory computer medium 14 for computer analysis. In an alternative embodiment, the processor will complete all calculations required to find the CdA.

The following are the changing variables that are to be measured, in the preferred embodiment, and by what sensor such variable is measured:

| Variable | Sensor/Method Measure |
| --- | --- |
| Inertia | Wheel spin down with algorithm or educated guess based on the wheel used |
| Head wind | Differential pressure sensor |
| Bike Speed | GPS sensor |
| Road Slope | Barometric pressure sensor |
| Acceleration | Calculated from speed (GPS sensor) |
| Temperature | Temperature and humidity sensor |
| Barometric pressure | Barometric pressure sensor |
| Humidity | Temperature and humidity sensor |
| Power | External power meter (on pedal, crank, or wheel hub) |
| Distance | Calculation - integrated from GPS speed |
| Altitude | Barometric pressure sensor |

Prior to calculating the CdA, the constant variables are defined. General constant variables include: sampling time, minimum speed, gravity, and the 12 constants for Wobus Polynomial. Constant variables specific to a user include:

| Variable | Sensor/Method to Measure |
| --- | --- |
| Total Mass | Weighing Scale |
| Chain Efficiency | Use pedal and hub based power input; Educated guess based on a list of categorised constants, whereby a user selects the constant based on the state of their chain (e.g. cleanliness) |
| Wheel Radius | Roll-out test |
| Rolling Resistance | With coast down calibration test or default values based on road condition |
| Date Shift (power) | calculation aligning calculated power with actual power |

Actual chain efficiency may be determined by using both a pedal based (total input power) and hub based (input power, output power reduced by chain efficiency loss) power measurement. In one embodiment, chain efficiency can be measured by measuring the power transfer to a flywheel.

In the processor, create a full time vector by adding up $\Delta T$ for each line of data, where $\Delta T$ is the change in time, and convert the units of measurement from milliseconds to seconds.

Computing Velocity, Distance, and Air Density

The distance variable can be computed by integrating velocity:

$$D_i = v_i \times \Delta T + D(i-1)$$

$$D_0 = 0$$

where $D_i$ is the distance at each calculation step in meters, $v_i$ is speed measured in meters per second, $\Delta T$ is the sample rate, i.e. change in time between the samples, and i is the index to step through the vector of values.

Altitude, can be calculated from the data measured by the barometric sensor, for example, using the barometric formula.

Road slope can be computed from the altitude vector using the following equation:

$$\Theta = a \tan d \ (\text{Alt}(i) - \text{Alt}(i-1)/D(i) - D(i-1))$$

where, $\Theta$ represents the slope of the road in degrees, a tan d is the inverse tangent in degrees, D is distance, and i is the index to step through vector of values.

Air density can be computed using the formulas:

$$\text{Wobus polynomial} = (C0 + T .* (C1 + T .* (C2 + T .* (C3 + T .* (C4 + T .* (C5 + T .* (C6 + T .* (C7 + T .* (C8 + T .* (C9))))))))));$$

$$Es = eso./\text{wobus}.\hat{} 8;$$

$$\text{Vapor pressure} = RH .* Es;$$

$$\text{Air density} = rho = (P./(Rd .* Tk)) .* (1-(0.378 .* Pv)./P);$$

Computing Wind Speed and Direction

The wind speed variable is computed by converting the differential pressure from the second differential pressure sensor 44 to wind speed. At 0 meters per second, the processor should read pressure at 0pa. Wind speed may then be calculated using the following:

$$\text{Wind speed} = \sqrt{((2(\text{Wind}X(i) - \text{Const}))/\rho(i)}$$

where, WindX(i) represents the index wind speed to step through vector of values, Const is the average of the first five seconds of wind pressure from the full data set, and ρ(i) represents index air density to step through vector of values.

The wind direction variable, in degrees, is computed via the following calculation:

$$\text{Wind direction} = C1 \times (Pa2/Wx^2)^3 + C2 \times (Pa2/Wx^2)^2 + C3 \times (Pa2/Wx^2) + C4\ C1 \times (Pa2/Wx^2)^3 + C2x(Pa2/Wx^2)^2 + C3 \times (Pa2/Wx^2) + C4$$

where C1, C2, C3, and C4 are constants determined with wind tunnel testing or calibration rides.

Computing Power Contributions

Power is measured by a power meter attached to a crank, pedal, or wheel hub of a rider's bike. The energy contribution from the wheel bearing is computed by:

$$Ewb = v(0.091 + (0.0087 * v))$$

where v is speed.

The energy contribution from potential energy (Ep) is computed by:

$$Ep = v(\sin(\Theta) * Mt * g)$$

where v is speed, $\Theta$ represents the slope of the road in degrees, Mt is the total weight of the vehicle, and g is gravity.

The energy contribution from kinetic energy (Ek) is computed by:

$$Ek = 0.5 * (Mt + I/r^2) * (\text{Speed1}^2) - (\text{Speed2}^2)$$

where Speed1 is the speed at the start of the integration length, Speed2 is the speed at the end of the integration length, Mt is the total weight of the vehicle, I is the moment of inertia, and r is the radius of the wheel. Integration length is defined as a term indicating collected data over a period of time in which each data point in integration to smooth the data. The displayed CdA value is updated every second but represents the average over the integration length.

The rolling resistance is computed by:

$$\text{Rolling resistance} = \cos(\Theta) * Crr * Mt * g * v$$

where $\Theta$ represents the slope of the road in degrees, Crr is the coefficient of rolling resistance, Mt is total weight of the vehicle, g is gravity, and v is speed.

Computing CdA

To compute CdA, integrate the power terms for sum of energy equation. Energy integration is done by summing the power components—from wheel bearing, Ep, Ek, and rolling resistance—for the duration of the integration length.

By using an integrated energy equation, the potential (elevation gain/loss) contribution simplifies to $$mg(\text{final} - \text{initial Elevation})$$

where m is the mass, and g is gravity. This step removes the requirement for an extremely precise road slope measurement at every sample.

New CdA values are calculated by stepping forward in time by 1 second—new energy sum is the same as previous but shifted by 1 second. Each reported CdA value represents the average over x seconds sampling period (over which time the sum of energy equation was applied). A new CdA value is reported every 1 second and always represents the previous integration length in seconds.

Predicting CdA

Data from the system measuring real-time aerodynamic drag of a moving vehicle 10 is uploaded via a processor to be stored in a computer-implemented application. The application uses artificial intelligence or machine learning to predict what the CdA will be in real-time based on scanning an image of a vehicle, for example a rider and cyclist, scanned into the computer-implemented application.

The computer-implemented application can read an image, and based on the model created from the collected data stored, the application can produce a predicted CdA. Further, based on the data stored, the application can predict, and inform a user, what changes should be made to the vehicle to produce a lower CdA.

An estimated rider position is based only on a single camera view from the front of the vehicle. The camera may be continuously scanned using a MEMS mirror to increase the field of view.

A Multi-Port Measurement System for Ease of Cleaning

Through the use of an additive manufacturing process to create the cavities, the channels can be quite small, keeping all debris near the external opening and eliminating risk of direct contamination or damage to the sensor connected to the other end.

In one embodiment, a trap system is implemented to ensure debris does not reach the sensor in extreme conditions. This trap can be executed in many embodiments. The trap system could be a larger chamber in which the cavity passes through and allows debris to fall to the bottom of the chamber, while maintaining sensing capabilities through a sensor-side cavity, which is also connected to this chamber.

The chamber serves as a break in the continuity of the sensing cavity. This break would allow for the user to open the chamber by way of a bolt or cover apparatus. The user would then be able to use a cleaning tool for the external-side cavity to remove debris.

The sensor-side cavity must be completely unaffected by this intervention (cleaning process) so as not to damage fragile sensors. Intervention includes the insertion of tools, the introduction of compressed air or any other method which could cause damage to fragile sensors.

Methods of Predicting Variables Using Machine Learning and Artificial Technology Methods for predicting:
changes to a vehicle position or equipment to reduce a CdA; and
an aerodynamic drag coefficient;
each of which comprise machine learning and artificial learning (AI). The machine learning and AI analyse a still image or a video that depicts a front view and side view of the vehicle. Information from the system for measuring real-time aerodynamic drag of a moving vehicle is used to inform the machine learning and AI system in each method.

A method of predicting a vehicle's position is derived from a single imaging source mounted on the vehicle, which comprises machine learning and AI. The machine learning and AI correlate a still image of a front and a side view of the vehicle to an on-board image. Information from the system for measuring real-time aerodynamic drag of a moving vehicle is used to inform the machine learning and AI system in each method.

A method of predicting rolling resistance comprises AI that analyses the frequency spectrum of a vertical acceleration component of a vehicle using a micro-electro-mechanical system accelerometer and a Fast Fourier Transform (FFT) algorithm.

What is claimed is:

1. A system for measuring real-time aerodynamic drag of a moving vehicle, comprising:
   a. a processor;
   b. a non-transitory computer-readable medium for storing data;

c. at least two Inertial Measurement Units (IMUs) mounted off axis to each other to reduce sensor noise by fusing data together to simultaneously measure wind speed and wind direction detected by a plurality of ports on a multi-port measurement system, wherein the IMUs are electrically connected to the processor and the non-transitory computer-readable medium;

d. a plurality of sensors for detecting forces surrounding the vehicle in motion, the plurality of sensors electrically connected to the processor and the non-transitory computer-readable medium; and e. the non-transitory computer-readable medium storing data from the IMUs and the plurality of sensors to be sent to the processor wherein the processor is configured to measure an aerodynamic drag coefficient of the vehicle by integrating an equation solving sum of forces to sum of energy balance.

2. The system of claim 1 wherein the multi-port measurement system is fabricated using additive manufacturing techniques for multiple measurement ports.

3. The system of claim 1 wherein the multi-port measurement system is 6 mm in diameter or smaller.

4. The system of claim 1 wherein the multi-port measurement system comprises channels 2 mm in diameter or smaller connecting a plurality of sensors for detecting forces surrounding the vehicle in motion with external elements through a plurality of holes 2 mm in diameter or smaller.

5. The system of claim 4 wherein a trap system is connected to the channels.

6. The system of claim 5 wherein the trap system comprises a larger chamber in which a channel passes through, allowing debris to fall to the bottom of the chamber.

7. The system of claim 6 wherein the larger chamber serves as a break in the continuity between the plurality of sensors and the plurality of holes, wherein the break allows a user to open the chamber by way of a bolt.

8. A method of predicting changes to a position of a moving vehicle to reduce an aerodynamic drag coefficient comprising machine learning and artificial intelligence that analyses a still image or video of a front view and a side view of the vehicle, using the system of claim 1.

9. A method of predicting an aerodynamic drag coefficient comprising machine learning and artificial intelligence that analyses a still image or video of a front view and a side view of a vehicle, using the system of claim 1.

10. A method of predicting a position of a moving vehicle from a single imaging source mounted on the vehicle, comprising machine learning and artificial intelligence that correlates a still image of a front and a side view of the vehicle to an on-board image, using the system of claim 1.

* * * * *